(12) United States Patent
Kupratis

(10) Patent No.: US 9,003,808 B2
(45) Date of Patent: Apr. 14, 2015

(54) TURBOFAN WITH GEAR-DRIVEN COMPRESSOR AND FAN-DRIVEN CORE

(75) Inventor: Daniel B. Kupratis, Wallingford, CT (US)

(73) Assignee: United Technologies Corporation, Hartford, CT (US)

( * ) Notice: Subject to any disclaimer, the term of this patent is extended or adjusted under 35 U.S.C. 154(b) by 763 days.

(21) Appl. No.: 13/287,446

(22) Filed: Nov. 2, 2011

(65) Prior Publication Data

US 2013/0104524 A1    May 2, 2013

(51) Int. Cl.
| F02C 3/10 | (2006.01) |
| F02C 1/06 | (2006.01) |
| F02K 3/02 | (2006.01) |
| F02K 3/04 | (2006.01) |
| F02K 3/06 | (2006.01) |
| F02K 3/077 | (2006.01) |
| F02C 3/107 | (2006.01) |

(52) U.S. Cl.
CPC ... *F02K 3/04* (2013.01); *F02K 3/06* (2013.01); *F02K 3/077* (2013.01); *F02C 3/107* (2013.01); *Y02T 50/671* (2013.01)

(58) Field of Classification Search
USPC .................. 60/792, 39.163, 226.1, 39.43
See application file for complete search history.

(56) References Cited

U.S. PATENT DOCUMENTS

| 2,702,985 | A | * | 3/1955 | Howell .......................... 60/226.1 |
| 3,673,802 | A |   | 7/1972 | Krebs et al. |
| 4,005,575 | A | * | 2/1977 | Scott et al. ..................... 60/226.1 |
| 4,251,987 | A | * | 2/1981 | Adamson ......................... 60/805 |
| 4,916,894 | A | * | 4/1990 | Adamson et al. ............. 60/226.1 |
| 6,901,739 | B2 |  | 6/2005 | Christopherson |
| 7,784,266 | B2 |  | 8/2010 | Baughman et al. |
| 7,832,193 | B2 |  | 11/2010 | Orlando et al. |
| 7,845,157 | B2 |  | 12/2010 | Suciu et al. |
| 8,104,265 | B2 | * | 1/2012 | Kupratis .......................... 60/262 |
| 2009/0074565 | A1 | * | 3/2009 | Suciu et al. ................. 415/122.1 |
| 2011/0056208 | A1 |  | 3/2011 | Norris et al. |

FOREIGN PATENT DOCUMENTS

| EP | 2009270 A2 | 12/2008 |
| EP | 2295763 A2 | 3/2011 |
| EP | 2551489 A2 | 1/2013 |
| WO | 2006059970 A2 | 6/2006 |

OTHER PUBLICATIONS

Extended European Search Report, mailed Jun. 18, 2013.

* cited by examiner

*Primary Examiner* — Gerald L Sung
(74) *Attorney, Agent, or Firm* — Kinney & Lange, P.A.

(57) ABSTRACT

A gas turbine engine comprises an outer engine case, a combustor, a high pressure spool and a low pressure spool. The combustor is disposed within the outer engine case. The high pressure spool is configured for rotation coaxially with the combustor. The low pressure spool is configured for rotation coaxially with the high pressure spool. The low pressure spool is configured to rotate at speeds faster than that of the high pressure spool during operation of the gas turbine engine. In one embodiment, the low pressure spool includes a gear system configured to rotate a low pressure compressor faster than a low pressure turbine. In another embodiment, the high pressure spool rotates outward of the combustor within the outer engine case. In another embodiment, the high pressure spool includes a drum having radially inward projecting blades and vanes and radially outward projecting fan blades.

28 Claims, 2 Drawing Sheets

TURBOFAN WITH GEAR-DRIVEN COMPRESSOR AND FAN-DRIVEN CORE

BACKGROUND

The present invention is directed to gas turbine engine architecture designs. In particular, the invention is directed to turbofan engines designed for supersonic and sub-sonic flight.

As gas turbine engines have evolved to achieve higher flight speeds, the temperatures and speeds within the high spool have proportionately risen. With current technology, it is becoming difficult or impossible to increase the pressure ratio within the high spool at such speeds and temperatures to further increase efficiency. In particular, the T3 temperature at the inlet of the combustor and the T4 temperature at the inlet of the high pressure turbine have risen to levels that produce unacceptably high stress levels and creep limitations in rotating components. There is a need for systems and methods that enable pressure ratios within the high pressure spool to be increased beyond current levels to further increase engine efficiencies at supersonic and sub-sonic speeds.

SUMMARY

The present invention is directed to a turbofan engine that operates at supersonic and sub-sonic speeds. A gas turbine engine comprises an outer engine case, a combustor, a high pressure spool and a low pressure spool. The combustor is disposed within the outer engine case. The high pressure spool is configured for rotation coaxially with the combustor. The low pressure spool is configured for rotation coaxially with the high pressure spool. The low pressure spool is configured to rotate at speeds faster than that of the high pressure spool during operation of the gas turbine engine. In one embodiment, the low pressure spool includes a gear system configured to rotate a low pressure compressor faster than a low pressure turbine. In another embodiment, the high pressure spool rotates outward of the combustor within the outer engine case. In another embodiment, the high pressure spool includes a drum having radially inward projecting blades and vanes and radially outward projecting fan blades.

DETAILED DESCRIPTION

Figure 1A:
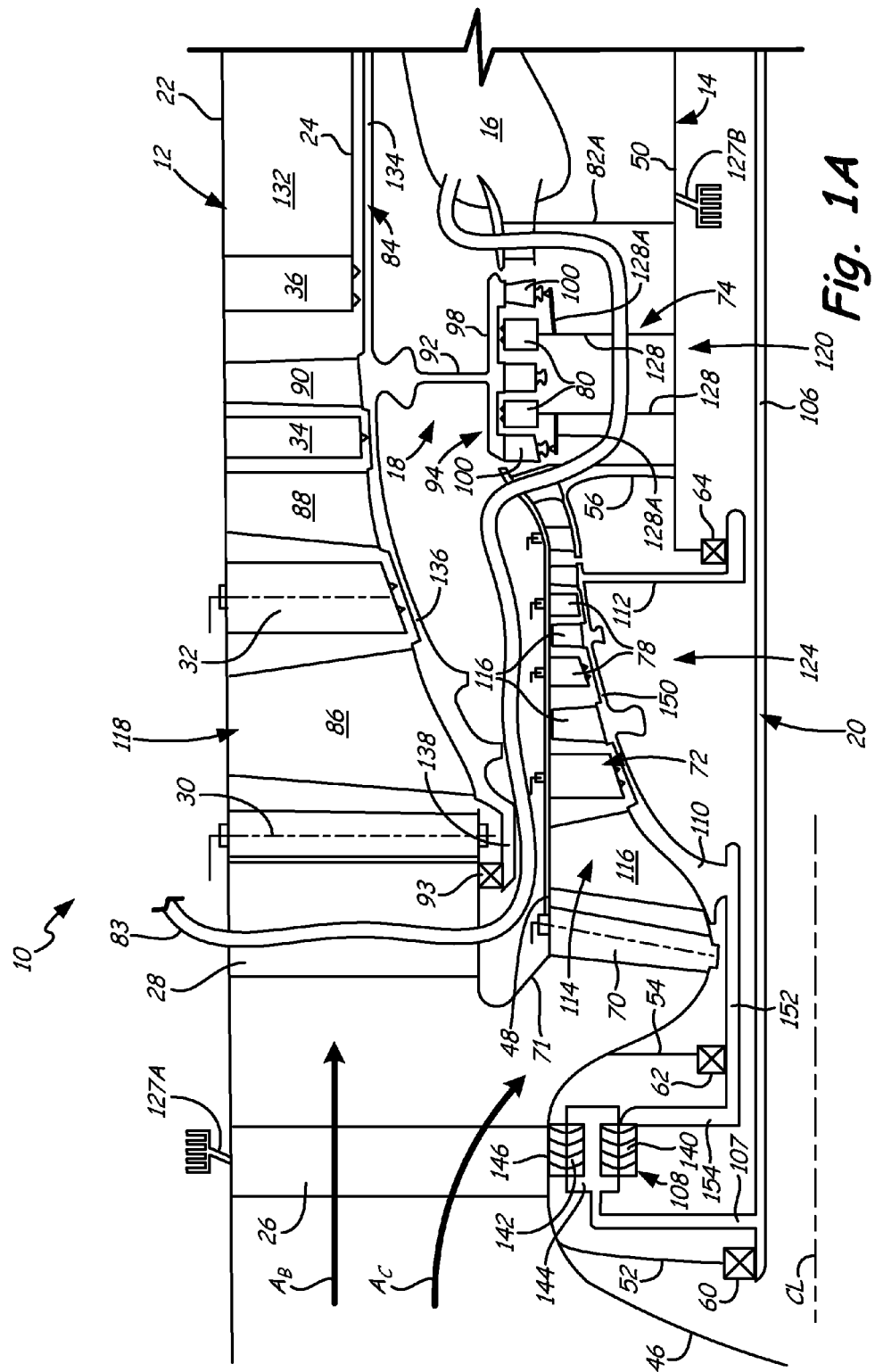
FIGS. 1A and 1B show a schematic cross-sectional view of a turbofan engine of the present invention.
Figure 1B:
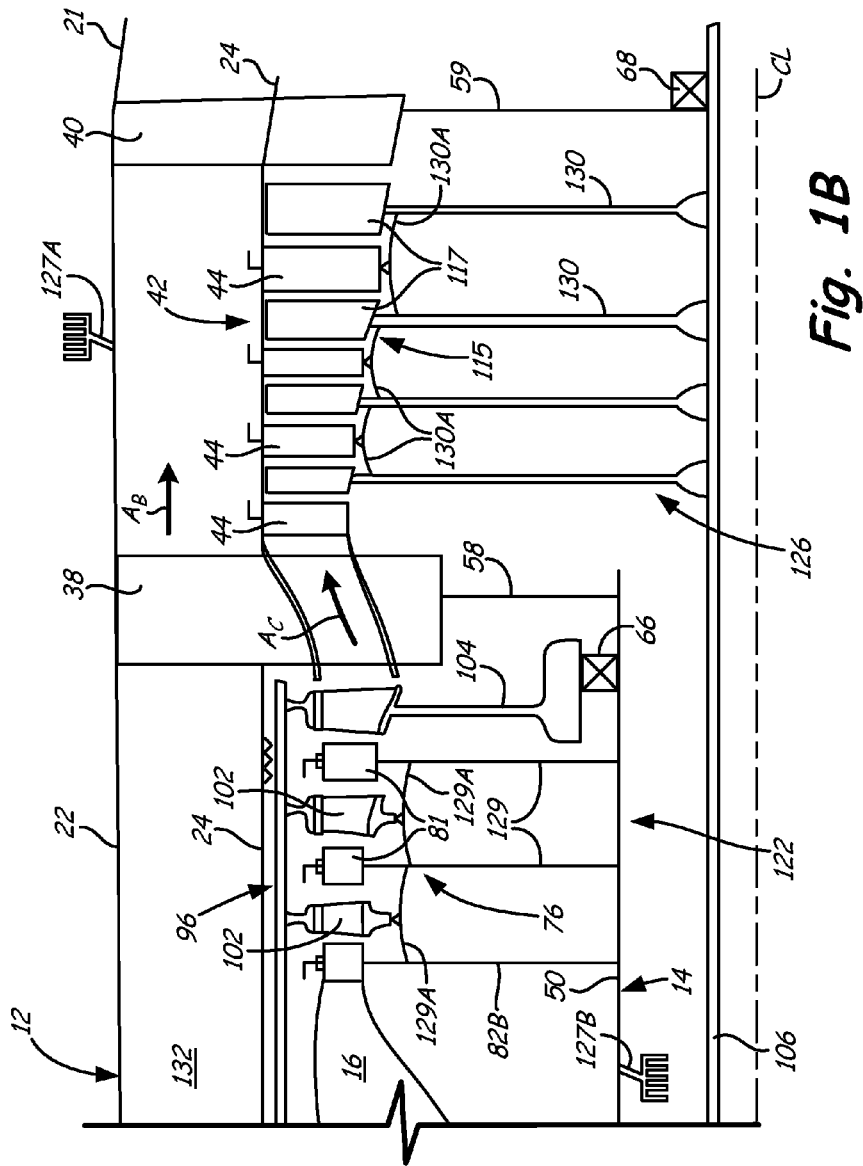

FIGS. 1A and 1B show a schematic cross-sectional view of turbofan engine 10 of the present invention wherein the low pressure compressor is driven by a low pressure turbine and gear system and the fan is driven by the high pressure spool.

Gas turbine engine 10 includes outer engine case 12, inner engine case 14, combustor 16, high pressure spool 18, low pressure spool 20 and exhaust nozzle 21. Outer engine case 12 includes outer duct 22, inner duct 24, strut 26, inlet guide vane 28, variable vanes 30 and 32, stator vanes 34 and 36, struts 38 and 40, and low pressure turbine vane array 42, which includes variable vanes 44. Inner engine case 14 includes nose 46, forward duct 48, aft duct 50, struts 52-59, bearings 60-68, variable vane 70, elbow 71, low pressure compressor vane array 72, high pressure compressor vane array 74 and high pressure turbine vane array 76. Low pressure compressor vane array 72 includes vanes 78, high pressure compressor vane array 74 includes vanes 80 and high pressure turbine vane array 76 includes vanes 81. Combustor 16 includes struts 82A and 82B and fuel line 83. High pressure spool 18 includes drum 84, fan blades 86-90, rotor disk 92, bearing 93, high pressure compressor blade array 94 and high pressure turbine blade array 96. High pressure compressor blade array 94 includes rotor 98 and blades 100. High pressure turbine blade array 96 includes blades 102 and rotor disk 104. Low pressure spool 20 includes shaft 106, extension 107, gear system 108, stub shaft 110, rotor disk 112, low pressure compressor blade array 114 and low pressure turbine blade array 115. Low pressure compressor blade array 114 includes blades 116, and low pressure turbine blade array 115 includes blades 117. FIGS. 1A and 1B show only an upper half of a cross-section of engine 10. As such, the components shown either extend in a complete annular hoop around centerline CL, or comprise one of a plurality of like components arranged in an array extending around centerline CL, as is conventionally understood.

Fan blades 86, 88 and 90, vanes 30, 32, 34 and 36 form fan stage 118. Blades 100 and vanes 80 form high pressure compressor (HPC) 120. Blades 102 and vanes 81 form high pressure turbine (HPT) 122. Blades 116 and vanes 78 form low pressure compressor (LPC) 124. Blades 117 and vanes 44 form low pressure turbine (LPT) 126. Blades 86-90, vanes 30-36, blades 100, vanes 80, blades 102, vanes 81, blades 116, vanes 78, blades 117 and vanes 44 comprise one of a plurality of blades and vanes distributed circumferentially around centerline CL.

Outer engine case 12 extends axially, concentric with centerline CL. Outer duct 22 comprises a generally cylindrical duct that provides a stationary component for mounting to an aircraft fuselage, such as indicated at grounds 127A. Inner duct 24 is displaced radially inward of outer duct 22 concentric with centerline CL to form an annular bypass passage with outer duct 22. Inner duct 24 is coupled to outer duct 22 via vane 36, strut 38 and strut 40 so as to also be stationary, as indicated by grounds 127B. Inner engine case 14, which comprises an annular body, is disposed radially inward of inner duct 24 concentric with centerline CL. Nose 46 of inner engine case 14 is supported from outer duct 22 via strut 26. At a forward end, forward duct 48 of inner engine case 14 is coupled to nose 46 via vane 70 and coupled to outer duct 22 via elbow 71 and vane 28. At an aft end, forward duct 48 is coupled to aft duct 50 via strut 56. Aft duct 50 is coupled to outer duct 22 via strut 58 and strut 38. Combustor 16 is supported within engine 10 via struts 82A and 82B, which extend radially outward from aft duct 50. Fuel line 83 extends from combustor 16 through strut 56, forward duct 48, strut 28 and outer duct 22 to connect to a fuel source (not shown).

High pressure spool 18 is supported within engine 10 via bearing 93 at a forward end and bearing 66 at an aft end. Drum 84 extends from bearing 93 radially outward of forward duct 48 to bearing 66 radially inward of inner duct 24 through rotor disk 104. Bearing 93 is supported by outer duct 22 via strut 28, and bearing 66 is supported by aft duct 50. Fan blades 86, 88 and 90 extend radially outward from drum 84 to be interposed with vane 30, vane 32, vane 34 and vane 36 to form fan stage 118. Vane 30 is supported between duct 22 and elbow 71 and in the embodiment shown is configured to rotate so as to vary its pitch. Vane 32 is cantilevered from duct 22 at its outer diameter end and is also configured to vary its pitch. Vane 34 is cantilevered from duct 22 and is fixed. Vane 32, vane 34, vane 36 and duct 24 include radially inwardly projecting knife edge seals, or some other seal, at their inner diameter ends to engage drum 84. As such, fan blade 86 is positioned axially between vanes 30 and 32, fan blade 88 is positioned axially between vane 32 and vane 34, and fan blade 90 is positioned axially between vane 34 and vane 36. Fan stage 118 thus comprises a multi-stage fan.

High pressure compressor blade array 94 extends radially inward from drum 84 via disk 92. Disk 92 couples to rotor 98, which extends axially forward and aft of disk 92 to support blades 100. Blades 100 extend radially inward from rotor 98 to be interposed with vanes 80, which are supported by duct 50 by struts 128, so as to form high pressure compressor 120. Struts 128 include sealing elements 128A that seal the radial inner extent of the flow path for core air $A_C$. High pressure turbine blade array 96 extends radially inward from drum 84. In particularly, blades 102 extend directly from drum 84 to be interposed with vanes 82, which are supported by duct 50 by struts 129, so as to form high pressure turbine 122. Struts 129 include sealing elements 129A that seal the radial inner extent of the flow path for core air $A_C$. Vanes 82 are pivotably adjustable so as to vary their pitch.

Low pressure spool 20 is supported within engine 10 via bearings 60, 62, 64 and 68. Shaft 106 extends from a forward, or upstream, end of engine 10 at bearing 60 to an aft, or downstream, end of engine 10 at bearing 68. Bearing 60 is coupled to nose 46 through strut 52. Bearing 68 is coupled to strut 40 through strut 59. Extension 107 projects radially outward from shaft 106 to provide a first coupling point for gear system 108. Stub shaft 110 is joined to gear system 108 at a second coupling point and extends axially downstream from gear system 108 radially inward of duct 48. In one embodiment, gear system 108 comprises an epicyclic, planetary gear system wherein stub shaft 110 of LPC 124 is connected to a sun gear, and LPT 126 is connected to a rotating carrier through shaft 106, as will be discussed below. A first end of stub shaft 110 is supported by bearing 62 through strut 54, which is grounded by nose 46. A second end of stub shaft 110 is supported at rotor disk 112 by bearing 64, which is grounded by aft duct 50. Blades 116 extend radially outward from stub shaft 110 to be interposed between vanes 70, 72 and 78 so as to form low pressure compressor 124. Vanes 78 are cantilevered radially inward from duct 48 so as to be pivotably adjustable to vary their pitch. Vanes 78 include knife edge seals to engage stub shaft 110. Low pressure turbine blade array 115 extends radially outwardly from shaft 106. Specifically, blades 117 are extended by rotors 130 to be interposed with vanes 44 so as to form low pressure turbine 126. Struts 130 include sealing elements 130A that seal the radial inner extent of the flow path for core air A. In one embodiment of the invention, rotors 130 comprise conventional turbine rotor disks, such as those having dovetail slots for receiving corresponding root portions of turbine blades. Vanes 44 are cantilevered from duct 24 so as to be pivotably adjustable to vary their pitch.

Struts 26, 28, 38, 40, 52-59, 82A, 82B, 128 and 129 comprise one of a plurality of blades and vanes distributed circumferentially around centerline CL to support outer engine case 12 and inner engine case 14 of engine 10. Bearings 60-68 and 93 support the rotation of high pressure spool 18 and low pressure spool 20 within outer engine case 12 and inner engine case 14 to allow operation of engine 10. Combustor 16 receives fuel from fuel line 83 and includes injectors and igniters to carry out a combustion process as is known in the art. In the embodiment shown, combustor 16 comprises an annular combustor; however other combustor arrangements as are known in the art may be used. Gas turbine engine 10 operates to produce bypass air $A_B$ and core air $A_C$. Inlet air travels into engine 10 between outer duct 22 and nose 46. Elbow 71 provides a flow splitter to direct bypass air $A_B$ radially outward and core air $A_C$ radially inward. Bypass air $A_B$ travels past strut 26 and strut 28, through fan stage 118 and into bypass passage 132 formed between outer duct 22 and inner duct 24, leaving engine 10 after passing by strut 38 and strut 40 at nozzle 21. Core air $A_C$ travels around nose 46, past vane 70, through LPC 124, HPC 120, combustor 16, HPT 122, and LPT 126 before mixing with bypass air $A_B$ in nozzle 21.

Gas turbine engine 10 is configured so that core air $A_C$ from combustor 16 is used to first drive the turbine that powers fan stage 118, rather than the fan being driven by a second, low pressure turbine as is done in conventional turbofans. In other words, core air $A_C$ flows first through HPT 122, which is configured to drive fan stage 118 and HPC 120, and then through LPT 126, which only drives LPC 124. Additionally, bypass air $A_B$ leaving fan stage 118 is not used to supercharge air provided to a compressor, as is done in conventional engines. For example, in typical turbofan engines, bypass air leaving the fan blades also passes through the low and high pressure compressors. In the present invention, rotation of fan stage 118 drives rotation of HPC 120. HPC 120, therefore, comprises a fan-driven core stage (FDCS) which supercharges core air $A_C$ before entering combustor 16. Such a configuration is enabled by providing drum 84 radially outward of combustor 16. Gas turbine engine 10 is also configured so that LPC 124 is driven by LPT 126 through speed-increasing gear system 108 to rotate at a higher speed than LPT 126.

The present invention permits low pressure spool 20 to rotate at high speeds, while high pressure spool 18 rotates at low speeds. In one embodiment of the invention, LPT 126 rotates at 10,000 RPM (revolutions per minute) and gear system 108 provides a 2.3:1 gear ratio so that LPC 124 rotates at 23,000 RPM. In such embodiment, high pressure spool 18 rotates at 6,500 RPM. Thus, the temperature and pressure of core air $A_C$ prior to entering combustor 16 can be increased. Because the speed of aircraft driven by engine 10 is primarily determined by the rotational speed of fan stage 118, the operating parameters of engine 10 are governed to control fan stage 118. In particular, the pressure ratio across HPT 122 is set to provide the desired speed of fan stage 118. As such, HPC 120 rotates at speeds dictated by fan stage 118. Thus, HPC 120 comprises a fan-driven core stage (FDCS). Furthermore, because fan stage 118 extracts work from HPT 122, temperature T4.5 within HPT 122 is reduced, thereby mitigating the need for providing cooling of blades 102 and vanes 81.

Drum 84 comprises annular shaft section 134, annular cone section 136, rotor disk 92, rotor 98 and blades 100. The leading end of cone section 136 includes shoulder 138 which provides a ring for receiving bearing 93. From shoulder 138, cone section 136 expands radially from a small diameter to a larger diameter at blade 90. In one embodiment, cone section 126 expands parabolically. Cone section 136 provides enough surface area for joining with fan blades 86, 88 and 90. Blade 90 provides a junction point between cone section 136, shaft section 134 and disk 92. Shaft section 134 provides a large diameter body that rotates about combustor 16 such that blades 102 can penetrate inward into core air $A_C$, thereby eliminating the need for placing disks in the elevated T4 temperatures. Disk 92 extends radially inward from shaft section 134 to engage rotor 98 with the flow of core air $A_C$. Rotor 98 comprises a cylindrical body that provides the radial outer extent of the flow path for core air $A_C$ within HPC 120. The forward end of rotor 98 engages forward duct 48, and the aft end of rotor 98 engages the inlet of combustor 16. Turbine blades 100 extend inward from rotor 98 to intersect the flow of core air $A_C$. Vanes 80 and blades 100 may include inner diameter platforms to seal the radial inner extent of the flow path for core air $A_C$. Cone section 136, disk 92 and blades 100 may include bulges, flanges or the like to provide weight for rotational balancing. The configuration of rotor 84 permits HPT 122 to be coupled to HPC 120 radially outward of combustor 16, which thereby provides a means for driving fan stage 118 without interfering with LPC 124.

LPC 124 includes stub shaft 110, which is driven by gear system 108. Gear system 108 comprises an epicyclic system having sun gear 140, planet gear 142, gear carrier 144 and ring gear 146. Shaft 106 extends upstream from LPT 126 to bearing 60. Downstream of bearing 60, radial projection 107 extends outward to engage gear carrier 144. Planet gear 142 rides within gear carrier 144. Ring gear 146 is mounted concentric with sun gear 140 inward of strut 26 and is stationary with respect to operation of engine 10. Rotation of projection 107 via shaft 106 rotates gear carrier 144, which causes planet gear 142 to orbit sun gear 140. Engagement of planet gear 142 with stationary ring gear 146 causes sun gear 140 to rotate at speeds faster than gear carrier 144. As such, gear system 108 is configured as a planetary gear system, operational principles of which are known in the art. With respect to engine 10, gear system 108 permits the speed of LPC 124 to be increased so that the speed of fan stage 118 can be reduced, without sacrificing pressure ratio across HPT 122.

Stub shaft 110 includes cone portion 150, annular shaft portion 152, radial projection 154 and rotor disk 112. Stub shaft 110 is driven by sun gear 140. Specifically, radial projection 154 extends radially inward from sun gear 140. Annular shaft portion 152 extends axially downstream from radial projection 154 past bearing 62. Nose 46, which generally comprises a U-shaped annular body, includes a radial bump to accommodate the space required for gear system 108 and projections 107 and 154. Nose 46 and gear system 108 are positioned axially forward of fan stage 118 and LPC 124. Cone portion 150 extends radially from a small diameter end at shaft portion 152 to a large diameter end at rotor disk 112. In one embodiment, cone portion 150 expands parabolically. Cone portion 150 provides enough surface area for joining with blades 116. Cone portion 150 may also include bulges, flanges or the like to provide weight for rotational balancing. Vanes 78 and blades 116 may include inner diameter platforms to seal the radial inner extent of the flow path for core air A. Rotor disk 112 extends radially inward from cone portion 150 to engage bearing 64. Specifically, rotor disk 112 includes a shoulder that provides a ring on which bearing 64 rides, which rides along duct 50. The configuration of stub shaft 110 permits engine 10 to be packaged in an axially and radially compact manner. For example, LPC 124 is positioned aft of gear system 108 to reduce the axial length of engine 10. Stub shaft 110 is also contoured to provide a constricting air passage for LPC 124, while still remaining compact in the radial direction. Furthermore, LPC 124 is disposed near centerline CL such that tip speed problems associated with high speed rotation of blades 116 are avoided.

Configured as such, engine 10 improves engine efficiency at various power levels for sub-sonic and supersonic flight speeds. Supersonic speeds result in higher inlet air temperatures T3 and pressure P3 at combustor 16. Fan stage 118 is driven by HPT 122 to reduce variation in fan operating speed between low-power and high-power operation of engine 10, which correspondingly reduces variation in engine inlet flow rates. HPC 120 rotates fan stage 118 and high pressure compressor blade array 94 at the same speeds, which ultimately enables higher temperature T3 and pressure P3 at the inlet of combustor 16. Specifically, LPC 124 rotates at high speeds to provide elevated pressure and temperature core air $A_C$ to HPC 120. Thus, HPC 120 is permitted to rotate at much lower speeds to provide super charged air to combustor 16. Thus, speeds of fan stage 118 can be kept slow, but temperature T3 and P3 are kept high the increased speed of LPC 124 from gear system 108. Stress levels in HPC 120 are therefore reduced due to the slower rotational speeds of high pressure spool 18. Slower rotational speeds of high pressure spool 18 permit temperature of the high pressure turbine inlet T4 to be increased due to reduced risk of stress levels and creep limitations from the slower speeds. Further, the use of drum 84 mitigates the effects of high T3 on HPT disk life, e.g., the use or disks in HPT 122 can be eliminated by using a drum that rotates outward of combustor 16.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine comprising:
   an outer engine case;
   an inner engine case coupled to the outer case radially inward of the outer engine case;
   a combustor disposed between the outer engine case and the inner engine case;
   a high pressure spool having an annular drum configured for rotation within the outer engine case; wherein the annular drum has an axially-extending portion configured for rotation outward of the combustor; and
   a low pressure spool having a drive shaft configured for rotation inward of the inner engine case.

2. The gas turbine engine of claim 1 wherein the drive shaft rotates at speeds faster than that of the annular drum during operation of the gas turbine engine.

3. The gas turbine engine of claim 2 wherein the low pressure spool comprises:
   a low pressure turbine blade array extending from the drive shaft;
   a low pressure compressor blade array extending from a stub shaft; and
   a gear system coupling the drive shaft to the stub shaft and configured so that the stub shaft rotates at speeds faster than that of the drive shaft during operation of the gas turbine engine.

4. The gas turbine engine of claim 1 wherein the high pressure spool further comprises:
   a plurality of compressor blades extending radially inward from a rotor and disposed upstream of the combustor, wherein the rotor is disposed radially inward from the axially-extending portion of the annular drum; and
   a plurality of turbine blades extending radially inward from the annular drum downstream of the combustor, wherein the annular drum extends axially between the outer engine case and the inner engine case.

5. The gas turbine engine of claim 4 wherein the high pressure spool further comprises:
   a fan stage driven by the high pressure spool between the outer engine case and the inner engine case, the fan stage comprising a plurality of fan blades extending radially outwardly from the annular drum.

6. The gas turbine engine of claim 5 and further comprising:

a plurality of compressor vanes extending radially outward from the inner engine case to engage the plurality of compressor blades and form a high pressure compressor;
a plurality of turbine vanes extending radially outward from the inner engine case to engage the plurality of turbine blades and form a high pressure turbine; and
a plurality of fan vanes extending radially inward from the outer engine case to engage the plurality of fan blades.

7. The gas turbine engine of claim 4 wherein the inner engine case comprises:
a forward duct;
an aft duct;
a support strut connecting the forward duct to the aft duct so that the aft duct is radially inward of the forward duct;
a forward strut connecting the forward duct to the outer engine case;
an aft strut connecting the aft duct to the outer engine case;
a plurality of low pressure compressor vanes extending radially inward from the forward duct;
a plurality of high pressure compressor vanes extending radially outward from the aft duct;
a plurality of high pressure turbine vanes extending radially outward from the aft duct;
a first bearing coupled to the forward duct; and
a second bearing coupled to the aft duct;
wherein the high pressure spool is disposed axially between the forward strut and the aft strut on the first and second bearings.

8. The gas turbine engine of claim 7 wherein the inner engine case further comprises:
an elbow joining the forward duct to the first bearing and the forward strut;
an inlet guide vane extending radially inward from the forward duct; and
a nose extending from the inlet guide vane.

9. The gas turbine engine of claim 1 wherein the low pressure spool further comprises:
a gear system coupled to the drive shaft, wherein the drive shaft extends axially within the inner engine case;
a stub shaft coupled to the gear system;
a plurality of turbine blades extending radially outward from the drive shaft downstream of the combustor; and
a plurality of compressor blades extending radially outward from the stub shaft upstream of the combustor.

10. The gas turbine engine of claim 9 and further comprising:
a plurality of turbine vanes extending radially inward from the outer engine case to engage the plurality of turbine blades and form a low pressure turbine; and
a plurality of compressor vanes extending radially inward from the inner engine case to engage the plurality of compressor blades and to form a low pressure compressor.

11. The gas turbine engine of claim 9 wherein:
the gear system comprises a planetary gear system that increases a rotational speed of the plurality of compressor blades over a rotational speed of the plurality of turbine blades.

12. The gas turbine engine of claim 9 wherein the outer engine case comprises:
an annular outer duct extending from an upstream end to a downstream end;
a plurality of vanes extending radially inward from the annular outer duct;
first and second struts extending radially inward from the annular outer duct downstream of the plurality of vanes;

an annular inner duct coupled to the annular outer duct via the first and second struts to form a bypass duct;
a plurality of vanes extending radially inward from the annular inner duct;
an aft strut extending radially inward from the annular outer duct;
an aft bearing coupled to the aft strut;
a forward strut extending radially inward form the annular outer duct; and
a forward bearing coupled to the forward strut;
wherein the aft bearing and the forward bearing support the low pressure spool within the inner engine case.

13. The gas turbine engine of claim 1 and wherein the high pressure spool further comprises:
a high pressure turbine blade array;
a high pressure compressor blade array, wherein the annular drum connects the high pressure turbine blade array and the high pressure compressor blade array; and
a fan stage extending from the annular drum.

14. The gas turbine engine of claim 1 wherein the low pressure spool further comprises:
a low pressure turbine blade array;
a low pressure compressor blade array;
a stub shaft extending from the low pressure compressor blade array; and
a planetary gear system coupling the drive shaft to the stub shaft.

15. A turbofan engine comprising:
a combustor for producing gas;
a high pressure turbine configured to be rotationally driven by the gas;
a high pressure compressor;
a high spool shaft coupling the high pressure turbine to the high pressure compressor;
a low pressure turbine configured to be rotationally driven by the gas leaving the high pressure turbine;
a low spool shaft coupled to the low pressure turbine;
a low pressure compressor;
a gear system coupling the low pressure compressor to the low spool shaft; and
a fan stage driven by the high spool shaft.

16. The turbofan engine of claim 15 wherein the gear system comprises:
a ring gear anchored to a non-rotating component of the turbofan engine;
a gear carrier configured to be driven by the low pressure turbine;
a plurality of planet gears mounted to the gear carrier; and
a sun gear disposed within the plurality of planet gears so as to drive the low pressure compressor at a speed higher than that of the high pressure turbine.

17. The turbofan engine of claim 15 wherein the high spool shaft comprises:
an annular drum comprising a forward end and an aft end; and
a cone section extending from the forward end of the annular drum;
a plurality of fan blades extending radially outward from the cone section;
a compressor disk extending radially inward from the forward end of the annular drum;
an annular rotor connected to the compressor disk;
a plurality of compressor blades extending radially inward from the annular rotor;
a plurality of turbine blades extending radially inward from the aft end of the annular drum; and a turbine disk extending radially inward from one of the plurality of turbine blades.

18. The turbofan engine of claim 17 wherein the high spool shaft is configured to rotate radially outward of the combustor.

19. The turbofan engine of claim 15 wherein the low pressure compressor comprises:
an annular shaft portion;
a first radial projection extending from a forward end of the annular shaft portion to join to the gear system;
a cone portion extending from an aft end of the annular shaft portion;
a plurality of compressor blades extending radially outward from the cone portion; and
a rotor disk extending radially inward from the cone portion to a bearing.

20. The turbofan engine of claim 15 and further comprising an outer engine case comprising:
an annular outer duct extending from an upstream end to a downstream end;
first and second struts extending radially inward from the annular outer duct downstream of the plurality of vanes;
an annular inner duct coupled to the annular outer duct via the first and second struts to form a bypass duct;
an aft strut extending radially inward from the annular outer duct;
an aft bearing coupled to the aft strut;
a forward strut extending radially inward form the annular outer duct; and
a forward bearing coupled to the forward strut;
wherein the aft bearing and the forward bearing support the low pressure turbine and the low pressure compressor.

21. The turbofan engine of claim 15 and further comprising an inner engine case comprising:
a forward duct;
an aft duct;
a support strut connecting the forward duct to the aft duct so that the aft duct is radially inward of the forward duct;
a forward strut extending radially outward from the forward duct forward of the fan stage;
an aft strut extending radially outward from the aft duct aft of the high pressure turbine;
a first bearing coupled to the forward duct; and
a second bearing coupled to the aft duct;
wherein the high pressure turbine and the high pressure compressor are disposed axially between the forward strut and the aft strut on the first and second bearings.

22. The turbofan engine of claim 15 wherein the low pressure compressor rotates at speeds faster than that of the low pressure turbine during operation of the gas turbine engine.

23. The turbofan engine of claim 15 wherein the high spool shaft rotates radially outward of the combustor and the low spool shaft rotates radially inward of the combustor.

24. A gas turbine engine comprising:
an outer engine case;
a combustor disposed within the outer engine case;
a low pressure spool configured for rotation coaxially with the combustor; and
a high pressure spool configured for rotation coaxially with the low pressure spool, the high pressure spool comprising:
an annular drum extending axially between a forward end and an aft end radially outward of the combustor;
a plurality of compressor blades extending radially inward from the drum upstream of the combustor;
a plurality of turbine blades extending radially inward from the drum downstream of the combustor; and
a plurality of fan blades extending radially outwardly from the annular drum.

25. The gas turbine engine of claim 24 wherein:
the low pressure spool comprises:
a low pressure turbine having a drive shaft;
a low pressure compressor having a stub shaft; and
a gear system coupling the drive shaft to the stub shaft and configured so that the stub shaft rotates at speeds faster than that of the drive shaft during operation of the gas turbine engine, wherein the stub shaft is configured to rotate at speeds faster than that of the high pressure spool during operation of the gas turbine engine.

26. A gas turbine engine comprising:
an outer engine case;
a combustor disposed within the outer engine case;
a high pressure spool configured for rotation coaxially with the combustor; and
a low pressure spool configured for rotation coaxially with the high pressure spool, the low pressure spool comprising:
a low pressure turbine having a drive shaft;
a low pressure compressor having a stub shaft; and
a gear system having a sun gear, a ring gear, a plurality of planet gears, and a gear carrier, wherein the gear system couples the drive shaft to the stub shaft and is configured so that the stub shaft rotates at speeds faster than that of the drive shaft during operation of the gas turbine engine, and wherein the sun gear connects to the stub shaft and the gear carrier connects to the drive shaft.

27. A gas turbine engine comprising:
an outer engine case;
a combustor disposed within the outer engine case;
a low pressure spool configured for rotation coaxially with respect to the combustor;
a high pressure spool configured for rotation coaxially with respect to the low pressure spool, wherein the high pressure spool has an annular drum having a portion radially outward from the combustor; and
a fan stage directly driven by the high pressure spool, wherein the fan stage has a plurality of fan blades extending from the annular drum.

28. A turbofan engine comprising:
an outer engine case through which gas flows from an upstream end to a downstream end, the outer engine case comprising:
a low pressure turbine vane array extending radially inward from the outer engine case near the downstream end;
an inner engine case disposed concentrically within the outer engine case, the inner engine case comprising:
a low pressure compressor vane array extending radially inward from the inner engine case;
a high pressure compressor vane array extending radially outward from the inner engine case downstream of the low pressure compressor vane array; and
a high pressure turbine vane array extending radially outward from the inner engine case downstream of the high pressure compressor vane array and upstream of the low pressure turbine vane array;
a combustor disposed between the high pressure compressor vane array and the high pressure turbine vane array;
a high pressure drum extending from an upstream end to a downstream end between the outer engine case and the inner engine case, the high pressure drum comprising:

a fan stage extending radially outward from the high pressure drum;

a high pressure compressor blade array extending radially inward from the high pressure drum to engage the high pressure compressor vane array; and a high pressure turbine blade array extending radially inward from the high pressure drum to engage the high pressure turbine vane array;

a low pressure shaft extending from the upstream end to the downstream end within the inner engine case, the low pressure shaft comprising:

a low pressure compressor blade array extending radially outward from the low pressure shaft to engage the low pressure compressor vane array; and an epicyclic gear system driven by the low pressure shaft; and a low pressure compressor shaft driven by the planetary gear system, the low pressure compressor shaft comprising a low pressure compressor blade array extending radially outward from the low pressure compressor shaft to engage the low pressure compressor vane array.

\* \* \* \* \*